Patented July 16, 1940

2,208,327

UNITED STATES PATENT OFFICE 2,208,327

VULCANIZATION OF RUBBER

Joy G. Lichty, Stow, Ohio, assignor to Wingfoot Corporation, Wilmington, Del., a corporation of Delaware No Drawing. Application January 22, 1937, Serial No. 121,825

7 Claims. (Cl. 260—792)

This invention relates to the acceleration of the vulcanization of rubber. More particularly, it embraces the discovery that addition products of amines with zinc salts of dithiocarbamic acids derived from secondary amines are very powerful accelerators of vulcanization.

Heretofore, the zinc salts of dithiocarbamic acids derived from secondary amines have found wide use as accelerators of vulcanization. Notable among such compounds are zinc dimethyl dithiocarbamate and zinc dibutyl dithiocarbamate. These zinc dithiocarbamates are in general ultra accelerators and find use in those rubber compounds which must be vulcanized within a very short period. These compounds have also been used as accelerators in the vulcanization of latex and zinc dibutyl dithiocarbamate has been found particularly suitable because of the fact that it has an appreciable solubility in rubber. Zinc dimethyl dithiocarbamate is practically insoluble in rubber but in those cases where it can be mixed properly with the rubber it is satisfactory.

By this invention a class of compounds is provided which are in general even more powerful accelerators than the zinc dithiocarbamates from which they are derived. Also, the compounds in general are relatively soluble in petroleum hydrocarbons and in rubber which makes them particularly valuable in latex compounding.

Illustrative of the addition products of the invention are those in which an amine selected from the group consisting of alicylic, phenalkyl, furfuryl and tetrahydro furfuryl primary amines, aliphatic primary amines having not more than ten carbon atoms, N-alkyl alicyclic secondary amines in which the alkyl group has not more than five carbon atoms, dialkyl alkylene diamines in which the alkyl and alkylene groups have not more than five carbon atoms each, N-alkyl phenalkyl secondary amines in which the alkyl group has not more than five carbon atoms, dialkyl amines having not more than eight carbon atoms, N-alkyl tetrahydro furfuryl secondary amines in which the alkyl group has not more than five carbon atoms, and poly methylene secondary amines in which the poly methylene chain may be interrupted by an oxygen atom, is reacted with a zinc salt of a dithiocarbamic acid derived from an amine having the formula

wherein R is a radical selected from the group consisting of alkyl, tetrahydro furfuryl, alicyclic and phenalkyl radicals and $R_1$ is a radical selected from the group consisting of alkyl, tetrahydro furfuryl and phenalkyl radicals or R and $R_1$ together form a poly methylene chain which may be interrupted by an oxygen atom.

The reaction appears to be simply one of addition and proceeds with facility. Preferably, the amines should be added to the zinc salt of the dithiocarbamic acid in liquid dispersion, generally in suspension or solution in water. In certain cases, it is advisable to heat the reaction mixture to provide a complete reaction between the materials. Similarly, the zinc salt may also be dissolved or suspended in other dispersing agents, such as alcohol, benzene, xylene and gasoline. In general, the amine and zinc dithiocarbamate react in molecular proportions but in some cases two or three or perhaps more mols of the amine will add to one mol of the dithiocarbamate.

The preferred compounds of the invention are those which are stable at normal room temperatures. In general, such compounds are those in which the additory amine portion is an amine which is relatively non-volatile. Thus, the amine addition compounds which are more stable than the dimethyl amine complex are preferred in the practice of the invention, although dimethyl amine and the less stable aliphatic amine derivatives are also included within the scope of the invention.

Further illustrative of the invention is the preparation of the addition product of cyclohexylamine and zinc dimethyl dithiocarbamate which is prepared by heating to the boiling point a mixture of 0.15 mols of zinc dimethyl dithiocarbamate, 0.495 mols of cyclohexylamine and 200 cc. of water. A colorless solid in an amount of 58.4 grams, which is 96% of the theoretical amount calculated for the compound formed by a mol per mol addition product of the amine and zinc dithiocarbamate was obtained. The product melted with decomposition starting at 169° C. Its nitrogen analysis also corresponded to that for the theoretical addition product of one mol of cyclohexyl amine with one mol of zinc dimethyl dithiocarbamate.

In another illustrative example a suspension of 45.8 grams of zinc dimethyl dithiocarbamate and 200 cc. of gasoline was stirred while 14.3 grams of mixed amyl primary amines, mostly iso amyl amine, were added to the suspension. The resulting solid material was filtered off and washed with gasoline, whereupon 55 grams of colorless solid were obtained. The colorless solid melted at 154° C. and is believed to be the addition product of one mol of amyl amine and one mol of zinc dimethyl dithiocarbamate. Water is also an excellent medium for the preparation of this complex.

In still another example illustrating the invention 32.7 grams of cyclohexyl amine were added to 47.8 grams of zinc penta methylene dithiocarbamate in 175 cc. of gasoline, the gasoline mixture being stirred during the meanwhile. The reaction mixture was heated on a hot plate for a short period of time after which the mass was cooled, the solid filtered off and washed with gasoline. A colorless solid, a mol per mol addition product of cyclohexyl amine and zinc penta methylene dithiocarbamate was obtained in an amount of 68.4 grams.

Other illustrative compounds of the invention are those given in the following table:

TABLE I

| | Zinc salt of dtcic acid derived from— | Additive amines | Molecular proportions | Product | Melting or decomposition point in °C. |
|---|---|---|---|---|---|
| 1. | Dibutylamine | Piperidine | 1A; 1Z | Light tan solid | 65–70 |
| 2. | Do | Cyclohexylamine | 1A; 1Z | ----do---- | 74–75 |
| 3. | Do | Ethylene diamine | 1A; 1Z | Yellow paste | |
| 4. | Do | ----do---- | 3A; 1Z | Brown solid | |
| 5. | Do | Mixed amyl primary amines | 1A; 1Z | Brown semi-solid | |
| 6. | Dimethylamine | Cyclohexylamine | 1A; 1Z | Colorless solid | 169 |
| 7. | Do | Sym. dibutyl ethylene diamine | | Tan solid | 95–100 (cloudy) |
| 8. | Do | Dimethylamine | | White solid | 249–250 (cloudy) |
| 9. | Do | Dibutylamine | 1A; 1Z | White solid | 238–241 |
| 10. | Do | N-ethyl cyclohexylamine | 1A; 1Z | Light yellow solid | 163–170 |
| 11. | Do | Benzylamine | 1A; 1Z | Light cream solid | 130–155 |
| 12. | Do | Tetrahydro alpha furfurylamine | 1A; 1Z | Light yellow solid | 149–151 |
| 13. | Do | Ethylene diaminemono hydrate | 3A; 1Z | Colorless solid | 135 |
| 14. | Do | Mixed amyl primary amines | 1A; 1Z | ----do---- | 154 |
| 15. | Do | High boiling amines* | | Yellow solid | 157–160 |
| 16. | Do | Piperidine | 1A; 1Z | Colorless solid | 128–133 |
| 17. | Do | Diethylamine | 1A; 1Z | ----do---- | 244–246 |
| 18. | Piperidine | Cyclohexylamine | 1A; 1Z | ----do---- | 110–144 |
| 19. | Do | Piperidine | 1A; 1Z | ----do---- | 145–147 |
| 20. | Dibenzylamine | ----do---- | 1A; 1Z | White solid | 147–149 |
| 21. | Do | Cyclohexylamine | 1A; 1Z | ----do---- | 155 |
| 22. | Do | Tetrahydro alpha furfurylamine | 1A; 1Z | Yellow crumbly solid | 90–95 |
| 23. | N-ethyl cyclohexylamine | Piperidine | 1A; 1Z | Light tan solid | 80–102 |
| 24. | Do | Cyclohexylamine | 1A; 1Z | ----do---- | 95–115 |
| 25. | Ditetrahydro α furfurylamine | Piperidine | 1A; 1Z | Light cream solid | 60–75 |
| 26. | Do | Cyclohexylamine | 1A; 1Z | Cream colored solid | 65–80 |
| 27. | Diamylamine | ----do---- | 1A; 1Z | Yellow brown liquid | |
| 28. | Do | Piperidine | 1A; 1Z | ----do---- | |

*High boiling alkylene poly amines obtained in the preparation of ethylene diamine, principally diethylene triamine and triethylene tetra amine.

In the third column "A" refers to the additive amine and "Z" to the zinc dithiocarbamate.

While the molecular proportions have been given, these figures are not known definitely to be the true proportions of the amine and dithiocarbamate in the final products although it is believed that such is the case. Also, the melting points or decomposition points, as they may be called, of many of the compounds have in general a fairly wide range. This is probably for the reason that many of the compounds have a melting point above that of the additive amine and some decomposition takes place upon the heating incident to obtaining the melting point. It may be that after some of the heating, portions of the amine and zinc dithiocarbamate starting materials are present with the addition product. These melting points were conducted in the normal atmosphere.

Several melting points taken in a sealed tube also gave a rather wide range. In the sealed tube the compounds generally started to melt at a lower temperature, however. Illustrative melting points taken in a sealed tube are as follows:

TABLE II

| Compound | M. P. in °C. | |
|---|---|---|
| | Open tube | Closed tube |
| Addition product of: | | |
| Zn dimethyl dithiocarbamate + ditetrahydro furfurylamine | 190–205 | 150–195 Starts at |
| Zn dimethyl dithiocarbamate + cyclohexylamine | 169 | 179–195 |
| Zn dimethyl dithiocarbamate + dimethylamine | 249–250 | 158–220 |
| Zn dimethyl dithiocarbamate + benzylamine | 130–155 | 127–157 |
| Zn ethyl cyclohexyl dithiocarbamate + piperidine | 80–102 | 80–100 |

Some of the melting points taken in the open air for the less stable addition products appear to approach the melting point for the zinc dithiocarbamate. For example, the addition product of dimethyl amine and zinc dimethyl dithiocarbamate melted at 249–250° C., which is the melting point of zinc dimethyl dithiocarbamate itself.

In each case nitrogen analyses of the compounds were obtained and, where the nitrogen analysis of the product differed from that of the zinc dithiocarbamate, further proved a definite addition of the amine to the zinc dithiocarbamate. Typical analyses are as follows:

TABLE III

Zinc dimethyl dithiocarbamate.ethylene-diamine monohydrate

| | Found | Theoretical values for $C_6H_{12}N_2S_4Zn.3(C_2H_8N_2.H_2O)$ |
|---|---|---|
| Percent N | 20.5, 20.4 | 20.8 |
| Percent S | 23.0, 23.0 | 23.8 |
| Percent Zn | 13.3, 13.3 | 12.1 |

Zinc dibutyl dithiocarbamate.ethylene diamine

|  | Found | Theoretical values for $C_{18}H_{36}N_2S_4Zn.C_2H_8N_2$ |
|---|---|---|
| Percent N | 9.92, 9.77 | 10.5 |
| Percent S | 23.8, 23.8 | 24.0 |

Zinc dibutyl dithiocarbamate.ethylene diamine

|  | Found | Theoretical values for $C_{18}H_{36}N_2S_4Zn.3(C_2H_8N_2)$ |
|---|---|---|
| Percent N | 16.8, 16.8 | 17.2 |
| Percent S | 19.6, 19.6 | 19.6 |
| Percent Zn | 10.4, 10.4 | 10.0 |

Zinc dibutyl dithiocarbamate.amyl amine

|  | Found | Theoretical values for $C_{18}H_{36}N_2S_4Zn.C_5H_{13}N$ |
|---|---|---|
| Percent N | 8.13, 8.08 | 7.50 |
| Percent S | 21.2, 21.2 | 22.9 |
| Percent Zn | 11.0, 10.9 | 11.7 |

Zinc dimethyl dithiocarbamate.cyclohexyl amine

|  | Found | Theoretical values for $C_6H_{12}N_2S_4Zn.C_6H_{13}N$ |
|---|---|---|
| Percent N | 9.53, 9.46 | 10.4 |

Zinc dimethyl dithiocarbamate.dibutyl ethylene diamine

|  | Found | Theoretical values for $C_6H_4N_2S_4Zn.C_{10}H_{24}N_2$ |
|---|---|---|
| Percent N | 11.1, 11.0 | 11.7 |

Zinc dimethyl dithiocarbamate.tetrahydrofurfurylamine

|  | Found | Theoretical values for $C_6H_4N_2S_4Zn.C_5H_{11}ON$ |
|---|---|---|
| Percent N | 10.3, 10.2 | 10.3 |

Zinc dibenzyl dithiocarbamate.piperidine

|  | Found | Theoretical values for $C_{30}H_{28}N_2S_4Zn.C_5H_{11}N$ |
|---|---|---|
| Percent N | 5.97, 5.97 | 6.05 |

It will be understood that while numerous examples have been described heretofore, the invention is not limited to them but includes other amine addition products of zinc dithiocarbamates derived from other secondary amines. Zinc dithiocarbamates derived from other secondary amines which may be employed in the practice of the invention are the zinc dithiocarbamates of diethyl amine, di n-propyl amine, di iso propyl amine, N-methyl cyclohexyl amine, N-butyl cyclohexyl amine, N-methyl o-methyl cyclohexyl amine, N-methyl tetrahydro alpha furfuryl amine, N-butyl tetrahydro alpha furfuryl amine, di (beta phenethyl) amine, morpholine, sym.-diethyl ethylene diamine, sym.-dibutyl trimethylene diamine, N-ethyl o-methyl cyclohexylamine, pipecoline, methyl propyl amine, methyl iso butyl amine, methyl ethyl amine, etc.

Similarly, it will be understood that while the additive amines previously disclosed are preferred, the invention is not limited thereto but includes many other amines. Illustrative are di propyl amine, hexahydro o- or p-toluidine, N-methyl cyclohexyl amine, N-methyl tetrahydro alpha furfuryl amine, N-ethyl tetrahydro alpha furfuryl amine, N-methyl hexahydro o-toluidine, pipecoline, sym-dimethyl ethylene diamine, sym-diethyl trimethylene diamine, sym-dipropyl ethylene diamine, beta phenethyl amine, di(beta phenethyl) amine, n-butyl amine, heptylamine, N-methyl iso butylamine, N-methyl ethyl amine, ethanol amine and N-methyl propyl amine.

Other illustrative amine addition products of zinc dithiocarbamates derived from secondary amines are the di(tetrahydro alpha furfuryl) amine addition products of zinc dimethyl dithiocarbamate and zinc diamyl dithiocarbamate, the di(beta phenethyl) amine addition products of zinc dimethyl dithiocarbamate, the N-butyl tetrahydro alpha furfuryl amine addition product of zinc dimethyl dithiocarbamate, the mono o-tolyl ethylene diamine addition product of zinc dimethyl dithiocarbamate, the mono alpha furfuryl amine addition product of zinc dimethyl dithiocarbamate, and the diamyl amine addition products of zinc dibutyl dithiocarbamate and zinc di(tetrahydro alpha furfuryl) dithiocarbamate.

In general, these amine addition products are more soluble in rubber than the zinc dithiocarbamates from which they are derived. For example, zinc dibutyl dithiocarbamate is soluble in rubber only to the extent of about 3% by weight. Its piperidine, cyclohexyl amine and amyl amine addition products are, however, very soluble in petroleum ether (practically in all proportions). Also, the addition product of zinc dimethyl dithiocarbamate and ethylene diamine is appreciably soluble in either cold or hot water, a property which makes it valuable for use in rubber articles in which the acceleration of vulcanization may be conducted merely by dipping them in an aqueous solution containing the accelerator.

In general, the compounds, while valuable for use in latex compounding, may also be used in any rubber product in which an ultra accelerator is desired. Illustrative of one rubber stock in which the compounds of the invention have been found particularly suitable is the following:

|  | Parts by weight |
|---|---|
| Smoked sheet rubber | 100 |
| Zinc oxide | 5 |
| Sulphur | 3 |
| Accelerator | As indicated |

Illustrative compounds of the invention were incorporated into separate portions of a rubber stock corresponding to the above formula after which the various rubber stocks were vulcanized for varying periods of time and physical tests obtained. The results are as follows:

TABLE IV

| Cure in mins. | Ult. tens. kgs./cm.² | Maximum elongation, percent | Modulus in kgs./cm.² | |
|---|---|---|---|---|
|  |  |  | 500% | 700% |
| (6) ADDITION PRODUCT OF ZINC DIMETHYL DITHIOCARBAMATE AND CYCLOHEXYL AMINE, 0.5 PART | | | | |
| 10/240 | 207 | 700 | 54 | 207 |
| 20 | 240 | 660 | 89 |  |
| 30 | 245 | 650 | 94 |  |
| 40 | 229 | 650 | 87 |  |
| 60 | 202 | 640 | 79 |  |

| Cure in mins. | Ult. tens. kgs./cm.² | Maximum elongation, percent | Modulus in kgs./cm.² 500% | Modulus in kgs./cm.² 700% |
|---|---|---|---|---|

(13) ADDITION PRODUCT OF ETHYLENE DIAMINE MONO HYDRATE AND ZINC DIMETHYL DITHIOCARBAMATE, 0.2 PART

| Cure in mins. | Ult. tens. | Max. elong. | 500% | 700% |
|---|---|---|---|---|
| 10/240 | 110 | 880 | 15 | 44 |
| 15 | 157 | 820 | 23 | 77 |
| 20 | 167 | 780 | 28 | 103 |
| 30 | 164 | 760 | 32 | 117 |
| 40 | 184 | 760 | 37 | 136 |

(12) ADDITION PRODUCT OF TETRAHYDRO ALPHA FURFURYL AMINE AND ZINC DIMETHYL DITHIOCARBAMATE 0.3 PART

| Cure in mins. | Ult. tens. | Max. elong. | 500% | 700% |
|---|---|---|---|---|
| 10/230 | 147 | 760 | 27 | 102 |
| 15 | 188 | 750 | 35 | 136 |
| 20 | 189 | 730 | 41 | 161 |
| 30 | 212 | 710 | 53 | 209 |
| 40 | 196 | 670 | 61 | |

(14) ADDITION PRODUCT OF MIXED AMYL PRIMARY AMINES AND ZINC DIMETHYL DITHIOCARBAMATE, 0.3 PART

| Cure in mins. | Ult. tens. | Max. elong. | 500% | 700% |
|---|---|---|---|---|
| 10/230 | 157 | 760 | 30 | 112 |
| 15 | 175 | 740 | 36 | 140 |
| 20 | 195 | 725 | 42 | 169 |
| 30 | 197 | 690 | 54 | |
| 40 | 208 | 670 | 61 | |

(15) ADDITION PRODUCT OF HIGH BOILING POLY ETHYLENE POLY AMINES AND ZINC DIMETHYL DITHIOCARBAMATE, 0.3 PART

| Cure in mins. | Ult. tens. | Max. elong. | 500% | 700% |
|---|---|---|---|---|
| 10/230 | 165 | 780 | 28 | 104 |
| 15 | 176 | 740 | 37 | 144 |
| 20 | 190 | 740 | 39 | 149 |
| 30 | 203 | 720 | 45 | 182 |
| 40 | 214 | 700 | 55 | 214 |

(16) ADDITION PRODUCT OF PIPERIDINE AND ZINC DIMETHYL DITHIOCARBAMATE, 0.3 PART

| Cure in mins. | Ult. tens. | Max. elong. | 500% | 700% |
|---|---|---|---|---|
| 10/230 | 156 | 775 | 27 | 103 |
| 15 | 165 | 735 | 35 | 135 |
| 20 | 185 | 710 | 46 | 177 |
| 30 | 210 | 800 | 56 | 210 |
| 40 | 224 | 680 | 67 | |

(17) ADDITION PRODUCT OF DIETHYL AMINE AND ZINC DIMETHYL DITHIOCARBAMATE, 0.3 PART

| Cure in mins. | Ult. tens. | Max. elong. | 500% | 700% |
|---|---|---|---|---|
| 10/230 | 177 | 775 | 30 | 116 |
| 15 | 178 | 720 | 39 | 157 |
| 20 | 195 | 710 | 46 | 186 |
| 30 | 215 | 685 | 61 | |
| 40 | 224 | 660 | 73 | |

(18) ADDITION PRODUCT OF CYCLOHEXYL AMINE ZINC PENTA METHYLENE DITHIOCARBAMATE, 0.3 PART

| Cure in mins. | Ult. tens. | Max. elong. | 500% | 700% |
|---|---|---|---|---|
| 10/230 | 130 | 720 | 31 | 115 |
| 15 | 178 | 740 | 35 | 138 |
| 20 | 160 | 650 | 38 | |
| 30 | 188 | 680 | 53 | |
| 40 | 198 | 670 | 63 | |

(3) ADDITION PRODUCT OF ETHYLENE DIAMINE AND ZINC DIBUTYL DITHIOCARBAMATE, (MOL PER MOL), 0.3 PART

| Cure in mins. | Ult. tens. | Max. elong. | 500% | 700% |
|---|---|---|---|---|
| 10/240 | 45 | 950 | 7 | 14 |
| 15 | 92 | 930 | 10 | 25 |
| 20 | 114 | 830 | 16 | 53 |
| 30 | 154 | 830 | 20 | 67 |
| 40 | 158 | 790 | 25 | 93 |

(4) ADDITION PRODUCT OF ETHYLENE DIAMINE (3 MOLS) AND ZINC DIBUTYL DITHIOCARBAMATE (1 MOL), 0.3 PART

| Cure in mins. | Ult. tens. | Max. elong. | 500% | 700% |
|---|---|---|---|---|
| 10/240 | 128 | 860 | 16 | 50 |
| 15 | 148 | 830 | 20 | 69 |
| 20 | 167 | 760 | 27 | 113 |
| 30 | 170 | 750 | 30 | 121 |
| 40 | 194 | 740 | 36 | 143 |

(5) ADDITION PRODUCT OF AMYL PRIMARY AMINES AND ZINC DIBUTYL DITHIOCARBAMATE, 0.3 PART

| Cure in mins. | Ult. tens. | Max. elong. | 500% | 700% |
|---|---|---|---|---|
| 10/240 | 18 | 830 | 5 | 10 |
| 15 | 64 | 910 | 8 | 20 |
| 20 | 91 | 850 | 12 | 38 |
| 30 | 110 | 770 | 19 | 68 |
| 40 | 145 | 740 | 28 | 107 |

(19) ADDITION PRODUCT OF PIPERIDINE AND ZINC PENTA METHYLENE DITHIOCARBAMATE, 0.3 PART

| Cure in mins. | Ult. tens. | Max. elong. | 500% | 700% |
|---|---|---|---|---|
| 10/240 | 78 | 800 | 14 | 43 |
| 15 | 143 | 800 | 20 | 75 |
| 20 | 139 | 730 | 28 | 111 |
| 30 | 190 | 730 | 39 | 156 |
| 40 | 200 | 710 | 49 | 191 |

The numbers to the left of the compounds tested refer to the compounds in Table I.

In general, the compounds of the invention also may be used in any latex or cement formula with excellent results. Illustrative of two rubber stocks in which compounds of the invention have been found particularly suitable are the following:

FORMULA I

| | Parts by weight |
|---|---|
| Rubber (as 60% latex) | 100 |
| Zinc oxide (Kadox) | 2.50 |
| Sulphur | 1.00 |
| Phenyl beta naphthylamine | 1.00 |
| Darvan (dispersing agent sold by R. T. Vanderbilt Co.) | 0.55 |
| Accelerator | 1.00 |

FORMULA II

| | Parts by weight |
|---|---|
| Rubber (as 60% latex) | 100 |
| Zinc oxide (Kadox) | 2.50 |
| Sulphur | 1.00 |
| Phenyl beta naphthylamine | 1.00 |
| Darvan | 0.55 |
| Casein | 0.05 |
| Caustic soda | 0.006 |
| Beta naphthol | 0.002 |
| Accelerator | 1.00 |

Illustrative compounds of the invention were incorporated into separate portions of the rubber stocks corresponding to the above two formulae, after which the various rubber stocks were vulcanized for varying periods of time and physical tests obtained. Tests were also made on the use of known zinc dithiocarbamates in the above two formulae. The mixing of the various compounds used in the two formulae was conducted according to known methods of latex compounding. The accelerators tested are identified as follows:

A. Addition product of piperidine and zinc dibutyl dithiocarbamate;
B. Addition product of cyclohexyl amine and zinc dibutyl dithiocarbamate;
C. Addition product of ethylene diamine and zinc dimethyl dithiocarbamate;
D. Addition product of cyclohexyl amine and zinc dimethyl dithiocarbamate;
E. Addition product of mixed amyl primary amines and zinc dimethyl dithiocarbamate;
F. Addition product of cyclohexyl amine and zinc pentamethylene dithiocarbamate;

G. Addition product of zinc dibutyl dithiocarbamate;
H. Addition product of zinc diethyl dithiocarbamate;
I. Addition product of zinc dimethyl dithiocarbamate.

The results obtained by the use of these accelerators are as follows, the data given in the following table all being for the cure of 30 minutes at 200° F.:

TABLE V

| Accelerator | Formula | Ult. tens. lbs./sq. in. | Max. elg. in percent | Tens. in lbs. per sq. in. | | |
|---|---|---|---|---|---|---|
| | | | | 500% | 600% | 700% |
| A | 1 | 2720 | 700 | 323 | 1420 | 2720 |
| B | 1 | 3270 | 800 | 300 | 1074 | 2160 |
| C | 1 | 2556 | 900 | 172 | 472 | 945 |
| D | 1 | 2610 | 850 | 197 | 528 | 1125 |
| E | 1 | 2807 | 850 | 200 | 588 | 1230 |
| F | 1 | 2056 | 810 | 189 | 513 | 1025 |
| G | 1 | 3260 | 800 | 303 | 950 | 2195 |
| H | 1 | 3290 | 900 | 223 | 536 | 1230 |
| I | 1 | 1850 | 900 | 139 | 310 | 584 |
| A | 2 | 2595 | 825 | 218 | 560 | 1287 |
| B | 2 | 3042 | 850 | 218 | 590 | 1342 |
| C | 2 | 3340 | 925 | 160 | 440 | 912 |
| D | 2 | 2657 | 900 | 174 | 448 | 946 |
| E | 2 | 2450 | 875 | 154 | 393 | 874 |
| F | 2 | 1540 | 825 | 138 | 334 | 678 |
| G | 2 | 2725 | 800 | 247 | 650 | 1600 |
| H | 2 | 3108 | 912 | 180 | 438 | 954 |
| I | 2 | 1790 | 900 | 123 | 325 | 622 |

From the preceding data it will be seen that a new class of a very powerful ultra accelerators is provided, the compounds in extremely small percentages causing the vulcanization of rubber at 230° F. They, furthermore, impart a relatively long curing range to the rubber compound and are useful in latex compounding. They may be prepared simply and are in most cases more economical to use than the zinc dithiocarbamates from which they are derived.

While the preferred embodiments of the invention have been described in detail herein it will be understood that the invention is not so limited but that various modifications may be made therein without departing from the spirit of the invention or from the scope of the appended claims. Similarly, while various theories have been expressed herein it will be understood that the invention is not limited thereby. It is intended that the patent shall cover, by suitable expression in the appended claims, whatever features of patentable novelty reside in the invention.

This application is a continuation in part of application Serial No. 44,766, filed October 12, 1935.

What I claim is:

1. The process of vulcanizing rubber which comprises vulcanizing it in the presence of an amine addition product of a zinc salt of a dithiocarbamic acid containing the radical of an amine having the formula

wherein R is a radical selected from the group consisting of alkyl, tetrahydro furfuryl, alicyclic and phenalkyl radicals and R₁ is a radical selected from the group consisting of alkyl, tetrahydro furfuryl and phenalkyl radicals, said group consisting also of the case where R and R₁ together form a chain selected from the group consisting of polymethylene and oxypolymethylene, said additive amine portion being selected from the group consisting of alicyclic, phenalkyl, furfuryl and tetrahydro furfuryl primary amines, aliphatic primary amines having not more than ten carbon atoms, N-alkyl alicyclic secondary amines in which the alkyl group has not more than five carbon atoms, dialkyl alkylene diamines in which the alkyl and alkylene groups have not more than five carbon atoms each, N-alkyl tetrahydro alpha furfuryl secondary amines in which the alkyl group has not more than five carbon atoms, N-alkyl N-phenalkyl secondary amines in which the alkyl group has not more than five carbon atoms, dialkyl amines having not more than eight carbon atoms, polymethylene secondary amines and oxypolymethylene secondary amines.

2. The process of vulcanizing rubber which comprises vulcanizing it in the presence of the addition product of cyclohexyl amine and a zinc salt of a dialkyl dithiocarbamic acid.

3. The process of vulcanizing rubber which comprises vulcanizing it in the presence of the addition product of cyclohexyl amine and zinc dimethyl dithiocarbamate.

4. The process of vulcanizing rubber which comprises vulcanizing it in the presence of the addition product of a saturated primary amine and a zinc salt of a dialkyl dithiocarbamic acid.

5. The process of vulcanizing rubber which comprises vulcanizing it in the presence of the addition product of piperidine and zinc pentamethylene dithiocarbamate.

6. A rubber product which has been vulcanized in the presence of an amine addition product of a zinc salt of a dithiocarbamic acid containing the radical of an amine having the formula

wherein R is a radical selected from the group consisting of alkyl, tetrahydrofurfuryl, alicyclic and phenalkyl radicals and R₁ is a radical selected from the group consisting of alkyl, tetrahydrofurfuryl and phenalkyl radicals, said group consisting also of the case where R and R₁ together form a chain selected from the group consisting of polymethylene and oxypolymethylene, said additive amine portion being selected from the group consisting of alicyclic, phenalkyl, furfuryl and tetrahydro furfuryl primary amines, aliphatic primary amines having not more than ten carbon atoms, N-alkyl alicyclic secondary amines in which the alkyl group has not more than five carbon atoms, dialkyl alkylene diamines in which the alkyl and alkylene groups have not more than five carbon atoms each, N-alkyl tetrahydro alpha furfuryl secondary amines in which the alkyl group has not more than five carbon atoms, N-alkyl N-phenalkyl secondary amines in which the alkyl group has not more than five carbon atoms, dialkyl amines having not more than eight carbon atoms, polymethylene secondary amines and oxypolymethylene secondary amines.

7. A rubber product which has been vulcanized in the presence of the addition product of a saturated primary amine and a zinc salt of a dialkyl dithiocarbamic acid.

JOY G. LICHTY.